United States Patent [19]

Gaskill

[11] Patent Number: 5,602,831
[45] Date of Patent: Feb. 11, 1997

[54] OPTIMIZING PACKET SIZE TO ELIMINATE EFFECTS OF RECEPTION NULLS

[75] Inventor: Garold B. Gaskill, Tualatin, Oreg.

[73] Assignee: Seiko Communications Systems, Inc., Beaverton, Oreg.

[21] Appl. No.: 414,746

[22] Filed: Mar. 31, 1995

[51] Int. Cl.$^6$ .................................................. H04Q 7/34
[52] U.S. Cl. ........................... 370/252; 455/52.1; 370/470; 370/473
[58] Field of Search .................................. 370/13, 17, 79, 370/82, 83, 84, 94.1, 95.1, 95.3, 99, 112; 340/825.44; 371/20.1, 20.2; 455/10, 52.1, 52.2, 52.3, 63, 65

[56] References Cited

U.S. PATENT DOCUMENTS

| | | | |
|---|---|---|---|
| 4,713,808 | 12/1987 | Gaskill et al. | 370/94 |
| 4,875,038 | 10/1989 | Siwiak et al. | 340/825 |
| 4,882,579 | 11/1989 | Siwiak | 340/825 |
| 4,891,637 | 1/1990 | Siwiak et al. | 340/825 |
| 4,897,835 | 1/1990 | Gaskill et al. | 370/94.1 |
| 4,928,096 | 5/1990 | Leonardo et al. | 340/825 |
| 4,940,963 | 7/1990 | Gutman et al. | 340/313 |
| 4,951,044 | 8/1990 | Nelson et al. | 340/825 |
| 5,020,056 | 5/1991 | Chennakeshu | 370/95.3 |
| 5,070,329 | 12/1991 | Jasinaki | 340/825 |
| 5,117,460 | 5/1992 | Berry et al. | 381/41 |
| 5,124,697 | 6/1992 | Moore | 340/825 |
| 5,142,279 | 8/1992 | Jasinski et al. | 340/825 |
| 5,142,692 | 8/1992 | Owen | 455/48 |
| 5,148,469 | 9/1992 | Price | 379/57 |
| 5,150,110 | 9/1992 | Breeden | 340/825 |
| 5,153,582 | 10/1992 | Davis | 340/825 |
| 5,155,479 | 10/1992 | Ragan | 340/825 |
| 5,159,331 | 10/1992 | Park et al. | 340/825 |
| 5,162,790 | 11/1992 | Jasinski | 340/825 |
| 5,166,932 | 11/1992 | Hoff et al. | 370/95.1 |
| 5,170,487 | 12/1992 | Peek | 455/45 |
| 5,185,604 | 2/1993 | Nepple et al. | 340/825.44 |
| 5,187,470 | 2/1993 | King et al. | 340/825.44 |
| 5,189,413 | 2/1993 | Gaskill et al. | 340/825.44 |
| 5,220,366 | 6/1993 | King | 354/76 |
| 5,239,667 | 8/1993 | Kanai | 455/10 |
| 5,260,700 | 11/1993 | Merchant et al. | 340/825.44 |
| 5,283,780 | 2/1994 | Schuchman et al. | 375/344 |
| 5,311,516 | 5/1994 | Kuznicki et al. | 370/94.1 |

OTHER PUBLICATIONS

Japanese Patent Application Opened No. 4,412/74 (Translation and Explanation Attached) Date Jan. 1974.
"High Speed Subcarrier Is Wave of Future" by Lyle Henry, Guest Commentary, *Radio World*, Jun. 1, 1994.

*Primary Examiner*—Melvin Marcelo
*Attorney, Agent, or Firm*—Elmer Galbi

[57] ABSTRACT

Packets are transmitted in different block sizes according to the speed of motion of the receiver. The packet block size is selected to minimize the effects of burst errors that occur at the receiver. The burst errors are disbursed between all packets in the packet block by interleaving the packets together prior to transmission. The receiver then deinterleaves the packets into their original format disbursing burst errors between all packets in the packet block. Since each packet will only contain a small proportion of the burst error, standard ECC schemes can be used to correct for bit errors in each packet increasing the probability that all packets will be transmitted successfully.

17 Claims, 13 Drawing Sheets

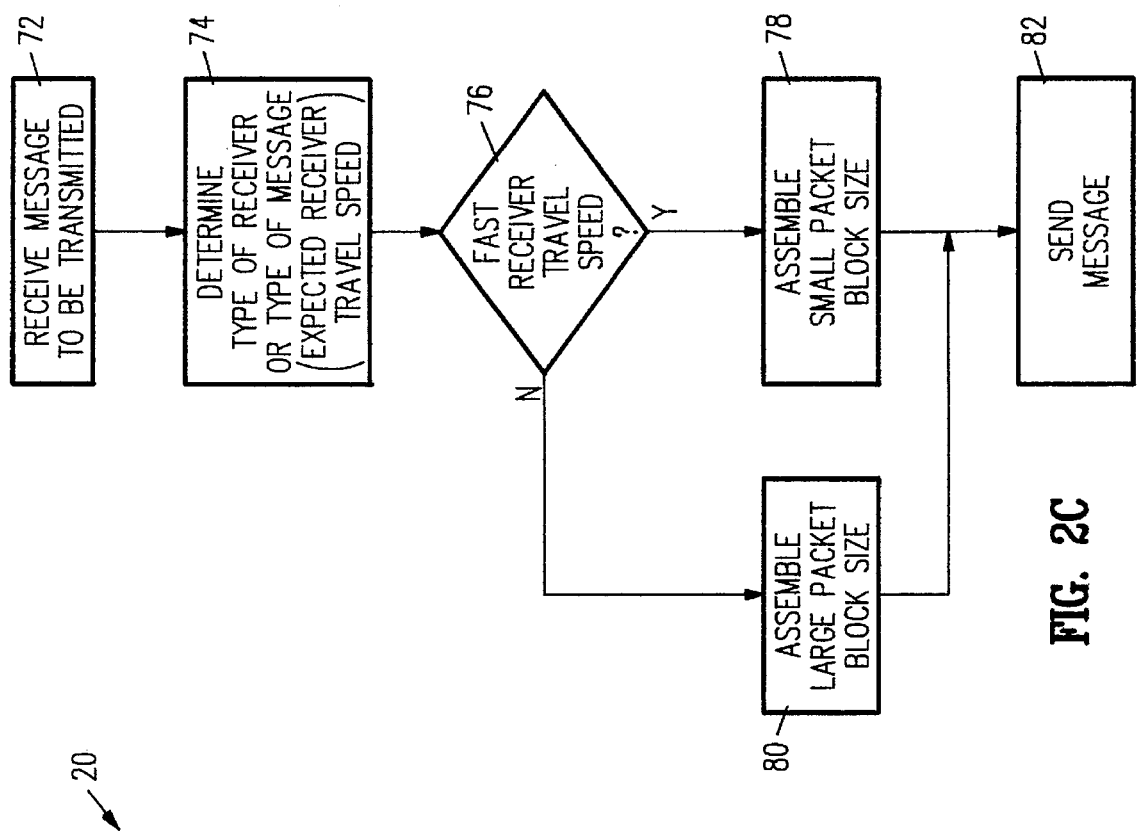
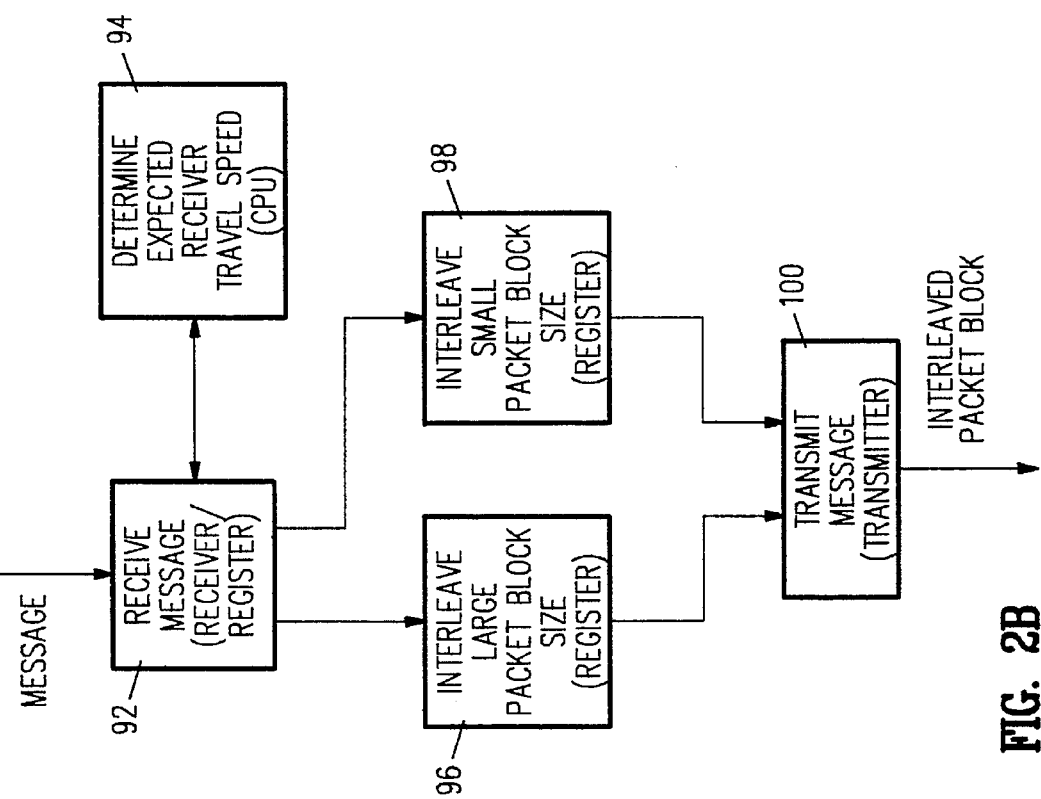
FIG. 2C
FIG. 2B

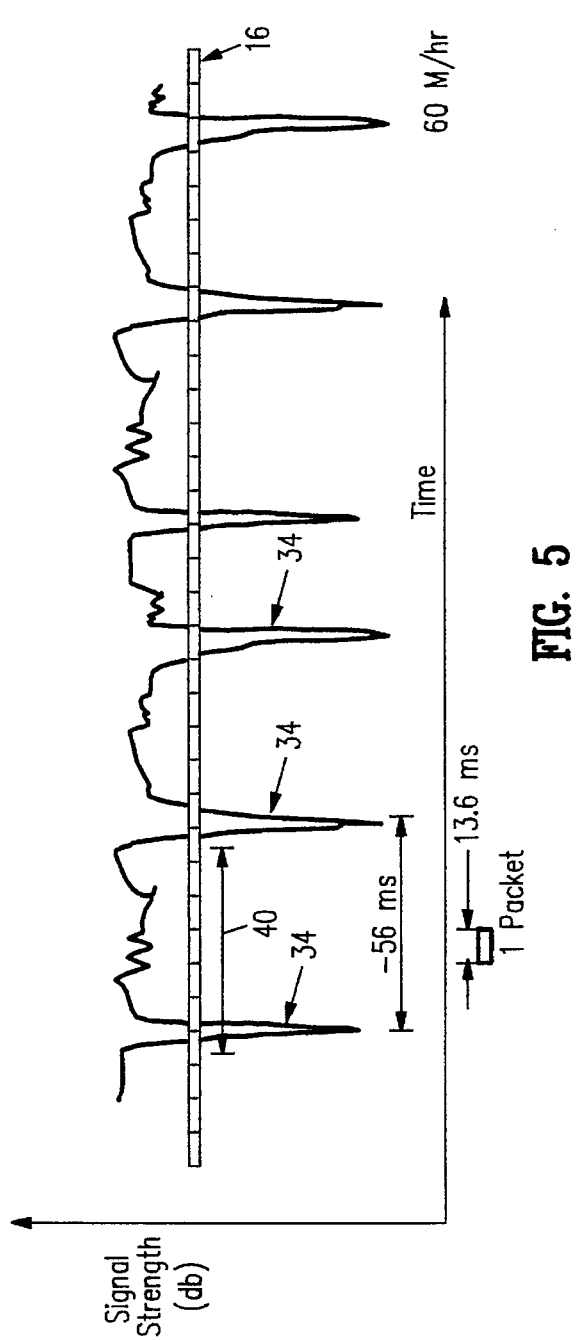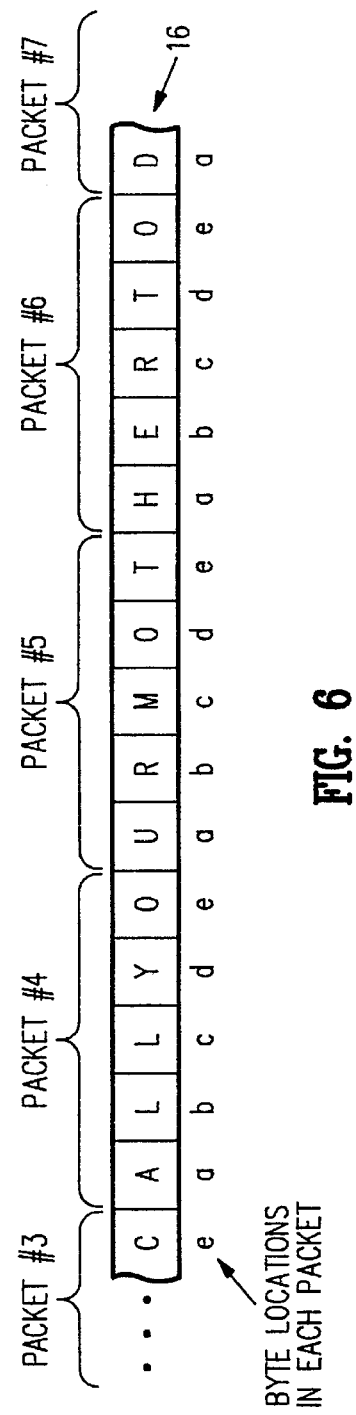

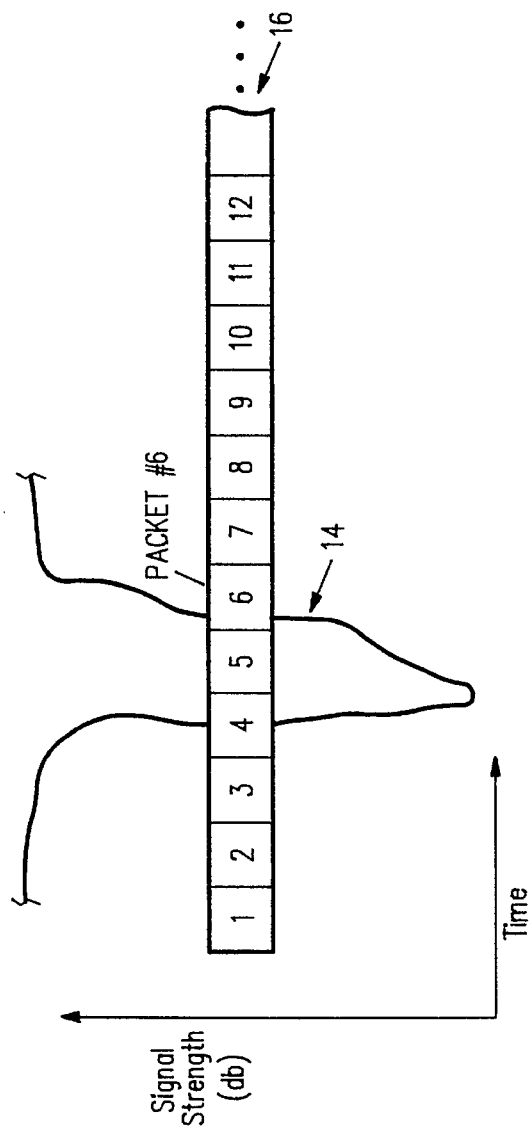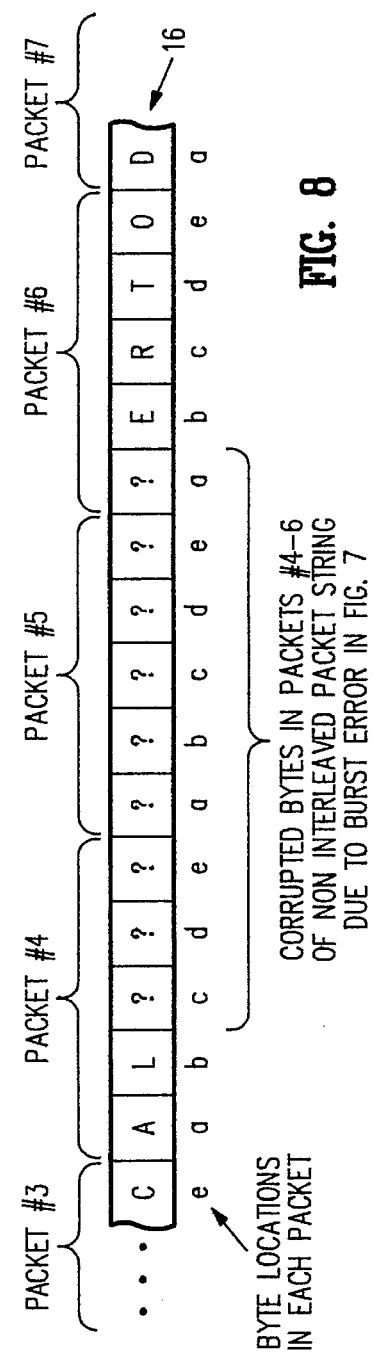
FIG. 7
FIG. 8

OPTIMIZING PACKET SIZE TO ELIMINATE EFFECTS OF RECEPTION NULLS

BACKGROUND OF THE INVENTION

This invention relates generally to increasing the reliability of wireless communication systems and more specifically to a system for varying the size of message packets according to the speed of motion of a receiver.

Radio paging systems and other types of wireless message broadcast systems transmit messages to remote receiving devices. For example, U.S. Pat. No. 4,713,808 to Gaskill et al. (Gaskill) describes a time division multiplexed (TDM) data protocol where pager messages are queued into 13.6 millisecond(ms)time slots which are then multiplexed together to form data frames. Each packet transmitted within a time slot contains 260 bits of information.

It is desirable that remote receivers reliably receive the transmitted information in each packet. However, due to a variety of factors, including environmental conditions, the messages contained in some packets are not always successfully received.

FIG. 1 is a graph showing the condition of an FM signal 12 at the receiver location. Signal 12 has spatial variations in signal strength (i.e., burst errors or nulls 14) that occur for discrete periods of time. Nulls 14 represent portions of signal 12 having a substantial loss of signal strength. Information in signal 12 coinciding with nulls 14 will not be successfully received by the target receiver.

A string of message packets 16, as described above in Gaskill, are shown extending along a horizontal axis representing time. Individual packet 18 of packet string 16 reaches the receiver during null 14. The null 14 destroys some or all of the bits in packet 18.

To correct for unsuccessfully received bits, the system in Gaskill includes a block error checking and correction code (ECC) scheme. However, the ECC scheme in Gaskill, can only correct for a limited number of corrupted bits in each packet (e.g., 7%).

To increase the probability of successfully receiving messages, the pager system in Gaskill retransmits the same message several times in each frame. However, retransmitting messages burdens a valuable communication resource, namely, the transmission path bandwidth. Each time a message is retransmitted, an additional portion of the transmission bandwidth is used for the same message instead of first transmission of other messages.

Another problem with simply retransmitting messages is that the burst error that corrupted the first message may also corrupt subsequent transmissions of the same message.

Several techniques have been devised for reducing the effects of nulls in transmission signals. For example, the same message can be transmitted over multiple frequencies. Since drop-out characteristics change according to carrier frequency, it is likely that portions of corrupted messages transmitted at a first frequency could be successfully received at an alternate carrier frequency.

Multiple transmitter stations are located at different physical locations so that the physical origin and signal strength of the message sent from each transmitter is different. The drop-out characteristics for the signals sent from each transmitter station are likely to be different. Thus, it is likely that the message will be successfully received from at least one of the multiple transmitter stations.

Transmitting and receiving the same message at different frequencies, or transmitting the same message from multiple transmitter stations, requires complex transmitter and receiver circuitry making the communication system more expensive to manufacture and operate.

Another technique for reducing the effects of burst errors involves interleaving multiple message packets together thus creating better burst error correction capabilities. Because receivers are portable, the signal drop-out characteristics at the receiver often change. As will be described below, transmitting a single interleaved packet size for varying signal drop-out conditions is not completely effective in minimizing burst error effects.

Accordingly, a need remains for increasing the probability of successfully receiving messages to receivers without using addition signal bandwidth.

SUMMARY OF THE INVENTION

Packets are transmitted in different block sizes according to the speed of motion of the receiver. The packet block size is selected to minimize the effects of burst errors (i.e., nulls) caused by multipath. Thus, the proportion of individual packets corrupted by nulls are reduced thus increasing the probability that each packet will be successfully received.

At relatively slow speeds, nulls in the transmitted signal are, in general, wide and have a relatively long time period before occurrence of the next null. At higher receiver speeds, nulls at the receiver are narrower and have a shorter time period. The size of packet blocks are adjusted according to these varying receiver null or drop-out characteristics so that only one null is likely to occur during the transmission of any one packet block. Thus, any corrupted data is distributed over an appropriate number of packets for the duration of the null.

Packets are encoded into packet blocks by first interleaving the packets together in a register. The interleaved packet block is then transmitted to the receiver. Because the packets are interleaved, a single burst error is dispersed over multiple packets. The receiver can then decode the packet block into the original packets. Since each packet now contains only a small proportion of the burst error, standard ECC schemes can be used to correct for any packet bit errors.

The transmitter determines the speed of the receiver, and accordingly the packet block size using various techniques. For example, an expected receiver speed is determined according to either the subject matter of the transmitted message, the type of receiver or via a two-way communication system where the receiver transmits receiver speed directly back to the transmitter.

Thus, the size of the transmitted packet blocks are varied to minimize the effects of burst errors, in turn, increasing the probability that packets will be successfully received without using any additional signal bandwidth or additional transmitter or receiver circuitry.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 2B is a detailed hardware schematic of the communication system shown in FIG. 2A.

FIG. 2C is a step diagram showing the various hardware operations performed by the communication system shown in FIG. 2B.

FIGS. 3–5 are graphs showing signal drop-out characteristics for receivers moving at 15 miles per hour, 30 miles per hour and 60 miles per hour, respectively.

FIG. 6 is an enlarged schematic diagram showing a portion of a noninterleaved packet string shown in FIGS. 3–5

FIG. 7 is an enlarged diagram of a burst error previously shown in FIG. 3.

FIG. 8 is a schematic diagram showing portions of the noninterleaved packet string corrupted by the burst error in FIG. 7.

DETAILED DESCRIPTION

Figure 2A:
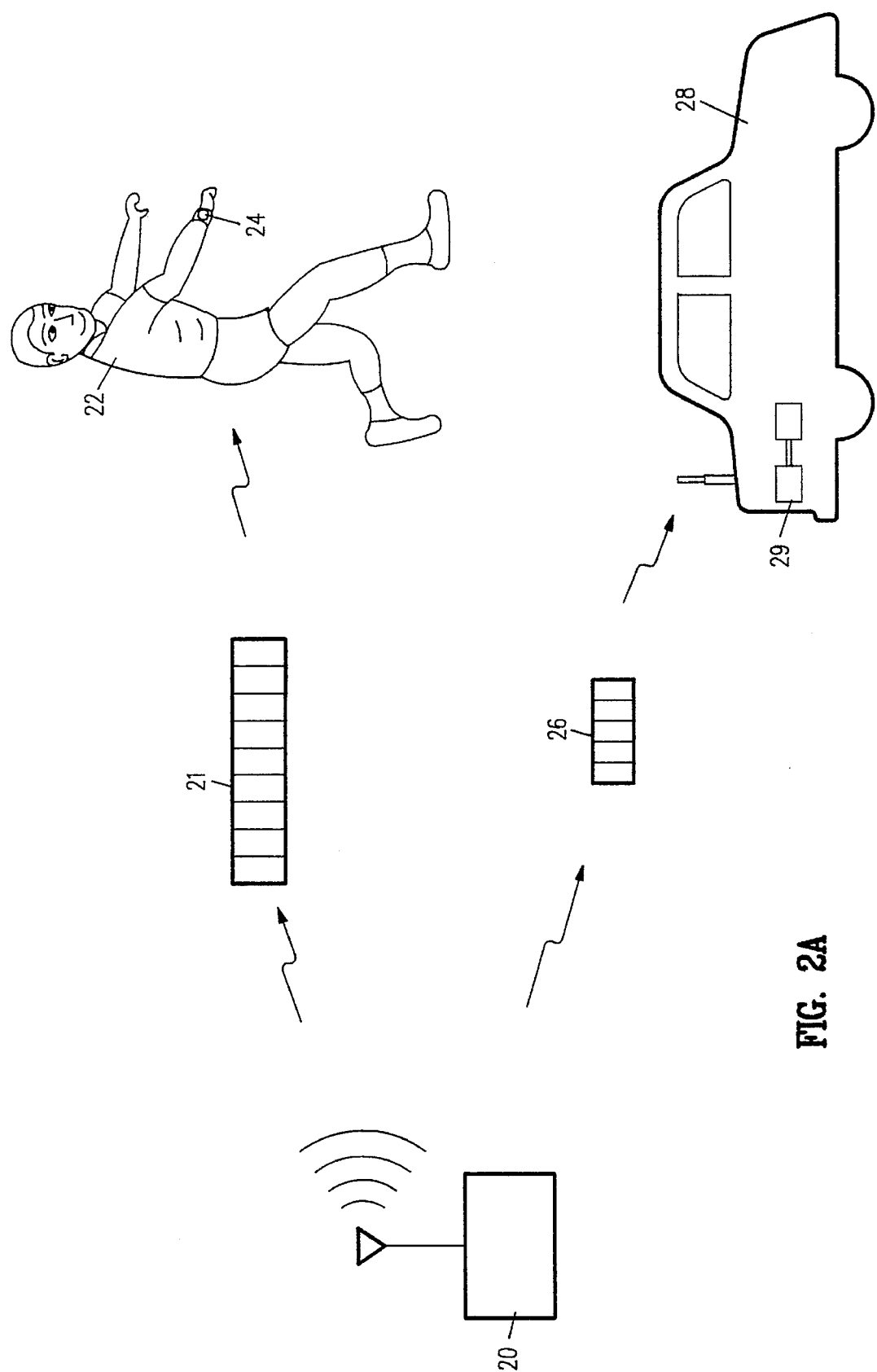
FIG. 2A is a schematic diagram showing a communication system according to the invention, that changes the size of transmitted packet blocks according to the speed of motion of the receiver.

FIG. 2A is a schematic diagram showing a transmitter 20 that sends variable sized packet blocks according to the speed of motion of the receiver. A human 22 wears a paging receiver 24 at a wrist location and represents an object that is stationary or moving at a relatively slow speed. For example, the typical walking speed of a human is approximately three miles per hour (MPH). A car 28 carries a receiver 29 and represents a object that travels at a relatively high speed. For example, car 28 typically travels at between 30 and 60 MPH or at walking speeds in stop and go traffic.

At low receiver speeds (e.g., 3 MPH) the transmitter sends a relatively large packet block 21 and at higher receiver speeds (30 MPH–60 MPH) the transmitter sends a smaller packet block 26. A large packet block size is defined as being encoded using a relatively large number of message packets. A small packet block size is defined as being encoded using a relatively small number of packets. Varying the packet block size according to the speed of motion of the receiver increases the probability that each packet in the packet block will be successfully received during burst error conditions.

FIG. 2B is a detailed schematic of the transmitter 20 shown in FIG. 2A. The transmitter includes a receiver/register 92 for receiving and temporarily storing a message for transmission to a receiver. The message is transferred to the transmitter either over a conventional land line or via wireless transmission. A central processing unit (CPU) 94 determines the expected receiver travel speed according to the message content or the type of receiver as will be discussed in detail below.

The message is then transferred to a register 96/98. The register 96 interleaves a message into a large packet block size. The register 98 interleaves a message into a small packet block size. The receiver/register 92 feeds the message either to register 96 or register 98 according to the expected receiver travel speed determined by CPU 94. A transmitter 100 then sends either the large packet block or the small packet block to the receiver.

FIG. 2C is a step diagram showing the operations performed by the receiver shown in FIG. 2B. The transmitter receives a message for transmission in step 72. The transmitter then determines the expected receiver travel speed in step 74.

The system in FIG. 2A does not provide two-way communication. Therefore, the transmitter determines the expected travel speed of the receiver by either the type of (e.g., wristwatch pager, car receiver, etc.) receiver or the contents of the transmitted message. For example, if the message is being transmitted to a wrist pager, the expected travel speed is slow. However, if the message is being transmitted to a car, the expected receiver travel speed is faster.

Alternatively, the contents of the message can determined according to the contents of the transmitted message. For example, traffic information is likely to be received by a receiver located in a car. Therefore, the expected receiver travel speed will be relatively fast.

If the expected receiver travel speed is fast, decision step 76 jumps to step 78 where the transmitter assembles packets into a relatively small packet block size. If the expected receiver travel speed is slow, decision step 76 jumps to step 80 where the transmitter assembles the packets into a relatively large packet block size. The packet blocks are then sent from the transmitter to the receiver in step 82.

Figure 1:
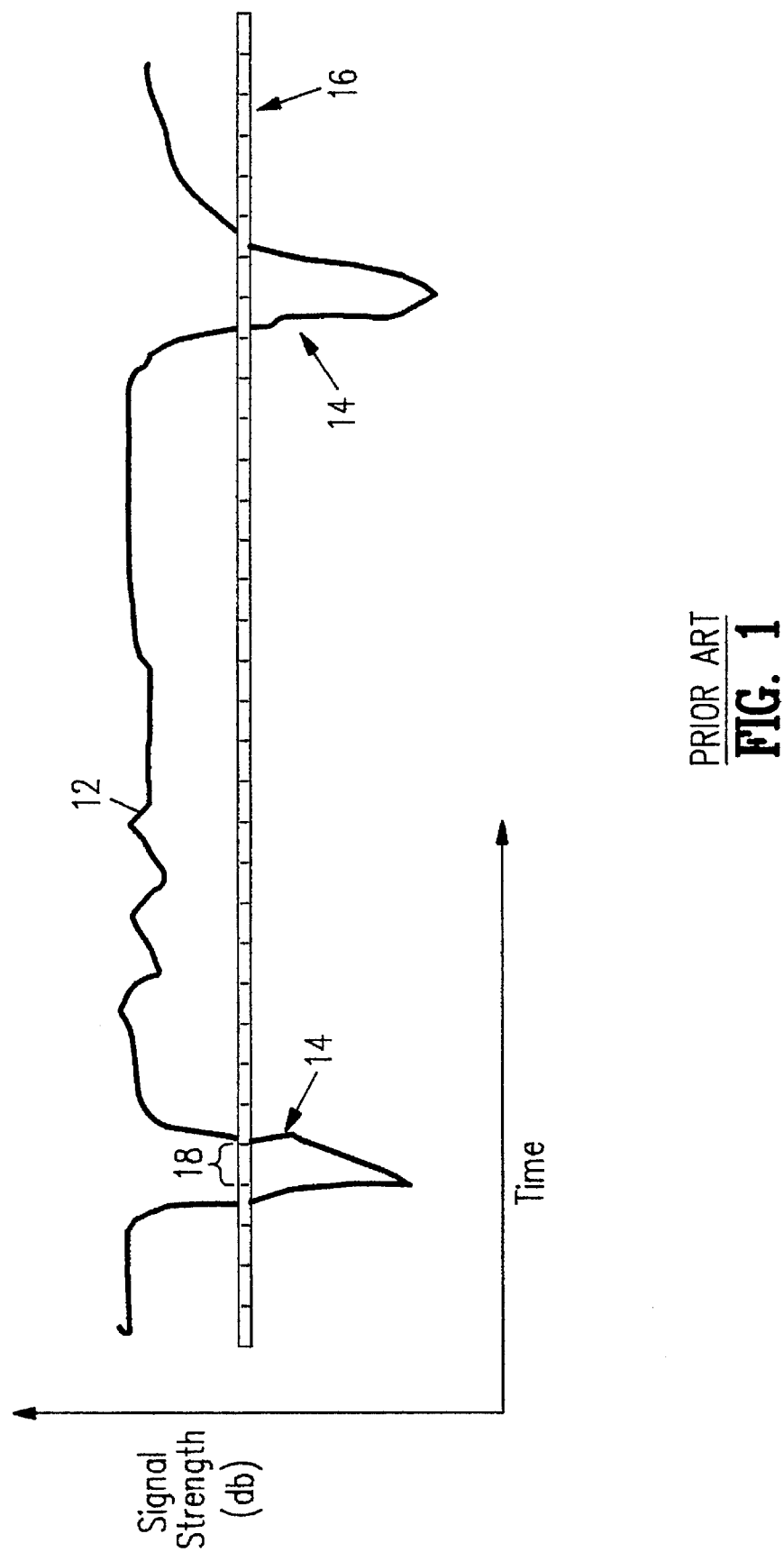
FIG. 1 is a graph showing signal drop-out characteristics for a receiver moving at a relatively slow speed.
Figure 3:
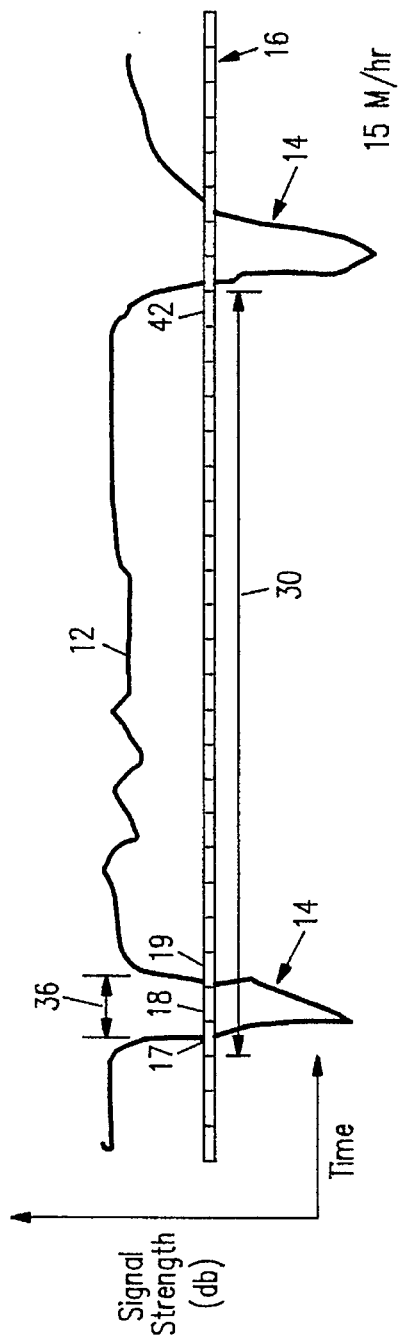
Figure 4:
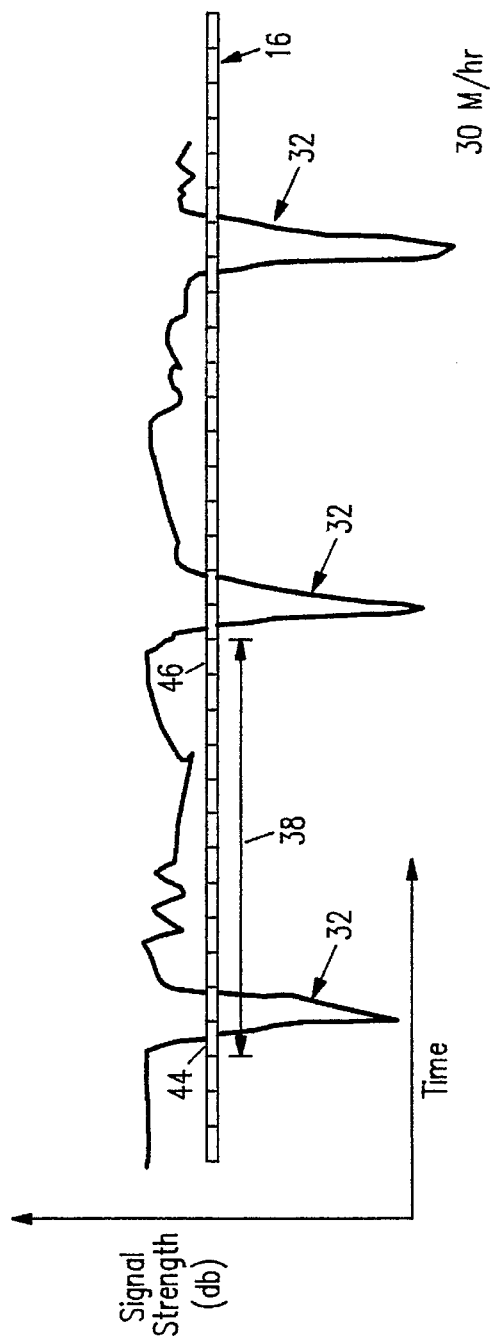

To explain further, FIGS. 3–5 are graphs showing signal drop-out characteristics for receivers moving at 15 MPH, 30 MPH and 60 MPH, respectively. The graph in FIG. 3 shows the same signal drop-out characteristic previously shown in FIG. 1. The vertical axis of FIGS. 3–5 represent signal strength in decibels (db) and the horizontal axis represents time. The individual packets in packet string 16 are encoded and transmitted in a manner similar to that discussed in Gaskill above which is herein incorporated by reference.

Null 14 represents a burst error that typically occurs from destructive interference due to signal reflections. Signal drop-out characteristics vary according to signal strength, receiver sensitivity and other environmental conditions. The signal strength, receiver characteristics and other environmental conditions associated with FIGS. 3–5 are assumed to be substantially similar. The physical condition that has varied the drop-out conditions between FIGS. 3, 4, and 5 is the speed of motion of the receiver. For example, the speed of motion of the receiver experiencing the drop-out conditions in FIG. 3 is 15 MPH and the speed of motion of the receiver experiencing the drop-out condition in FIG. 4 is 30 MPH.

The vertical location of packet string 16 defines a threshold signal strength level. When the signal strength of signal 12 is above packet string 16 the message signal 12 is likely to be successfully received by the receiver. When the signal strength of signal 12 falls below packet string 16 the message on signal 12 is destroyed by null 14 and not successfully received by the receiver.

When the receiver is moving at 15 MPH (FIG. 3), nulls 14 have a relatively wide time duration 36 and have a relatively long time period 30 between adjacent nulls. Alternatively, when the speed of motion of the receiver is at 60 MPH (FIG. 5), nulls 34 are narrow and have a relatively short time period 40.

Referring specifically to FIG. 3, packets 17–19 reside within null 14. Therefore, all or a portion of the bits in these packets are not likely to be successfully received by the receiver. If only a small number of bits in packets 17, 18 or 19 are corrupted, burst error correction coding techniques, such as described in Gaskill, can be used to correct the corrupted bits. However, a packet with a large number of corrupted bits cannot be corrected and must be retransmitted.

Experimental results have shown that nulls associated with transmitted signals occur on the average twice per wavelength. A dimensionless formula which expresses the relationship of these variables assuming one packet per wavelength/2 is as follows.

$$1=(c/(freq*2)*bps/(bpb*mps) \quad \text{(Equation 1)}$$

where:

c=speed of light $3*10^8$ m/s bps=bits per second bit (symbol) rate for the system freq=frequency in cycles per second for carrier bpb=bits per packet block mps=meters per second travel speed of mobile receiver The travel speed of the mobile receiver at this point is referred to as the critical speed. At the critical speed there is (on average) one null per packet block. At higher speeds than the critical speed there are multiple nulls per packet.

When there are multiple nulls per packet block, single burst error correction methods become ineffective as will be further discussed below. At extremely high travel speeds (or very low data rates) a bit oriented error correction scheme may be used as the null times are on the order of a bit time. At lower travel speeds than the critical speed, there is either one null in the packet (typically larger than can be corrected) or no nulls at all in the packet and only limited error correction or no error correction is required (increasing throughput).

The number of packets encoded together to form packet blocks is varied according to the critical travel speed of the receiver to minimize the number of bits corrupted in each packet. In general, the block size is selected to substantially match the null periods (30, 38, 40) associated with the specific receiver travel speed.

In FIG. 3, the transmitted packet block is encoded to contain the number of packets between packets 17 through 42. When the receiver is traveling at 30 MPH (FIG. 4), the packet block size is selected to substantially equal the number of packets contained between packets 44 through 46. By encoding the packet block size to be substantially equal to the critical speed or null period, each packet block will only extend through one null. Thus, the effect of a single burst error will be disbursed over the greatest possible number of packets.

To explain further, FIG. 6 shows a message "CALL YOUR MOTHER TODAY" contained within a noninterleaved packet string 16. The packet string is shown without burst errors. The various characters of the message are shown contained in bytes (a–e) of packets 3–7. The number of bytes contained in each packet can vary according to the communication system protocol and are shown in FIG. 5 as containing 5 bytes simply for illustrative purposes. Each packet also contains standard error correction bits, control bits etc. which are not shown but are described in detail in Gaskill.

FIG. 7 is an enlarged diagram showing the burst error 14 previously shown in FIG. 3. FIG. 8 shows the bytes in packets 4–6 unsuccessfully received by the receiver 22 or receiver 29 (FIG. 2A) due to burst error 14. The character "?" indicates an unsuccessfully received or "corrupted" byte in the associated packet. Since bytes in each packet are transmitted in sequential order, the burst error 14 corrupts every byte in packet 5 (100%), 3 bytes in packet 4 (60%) and one byte in packet 6 (20%).

As described above, ECC techniques can only correct for a limited number of corrupted bits. Assuming an arbitrary correction floor at 20%, only byte "e" in packet 6 can be effectively corrected by the ECC scheme. Since bytes in packets 4 and 5 cannot be corrected, both packets must be retransmitted.

Figure 9:
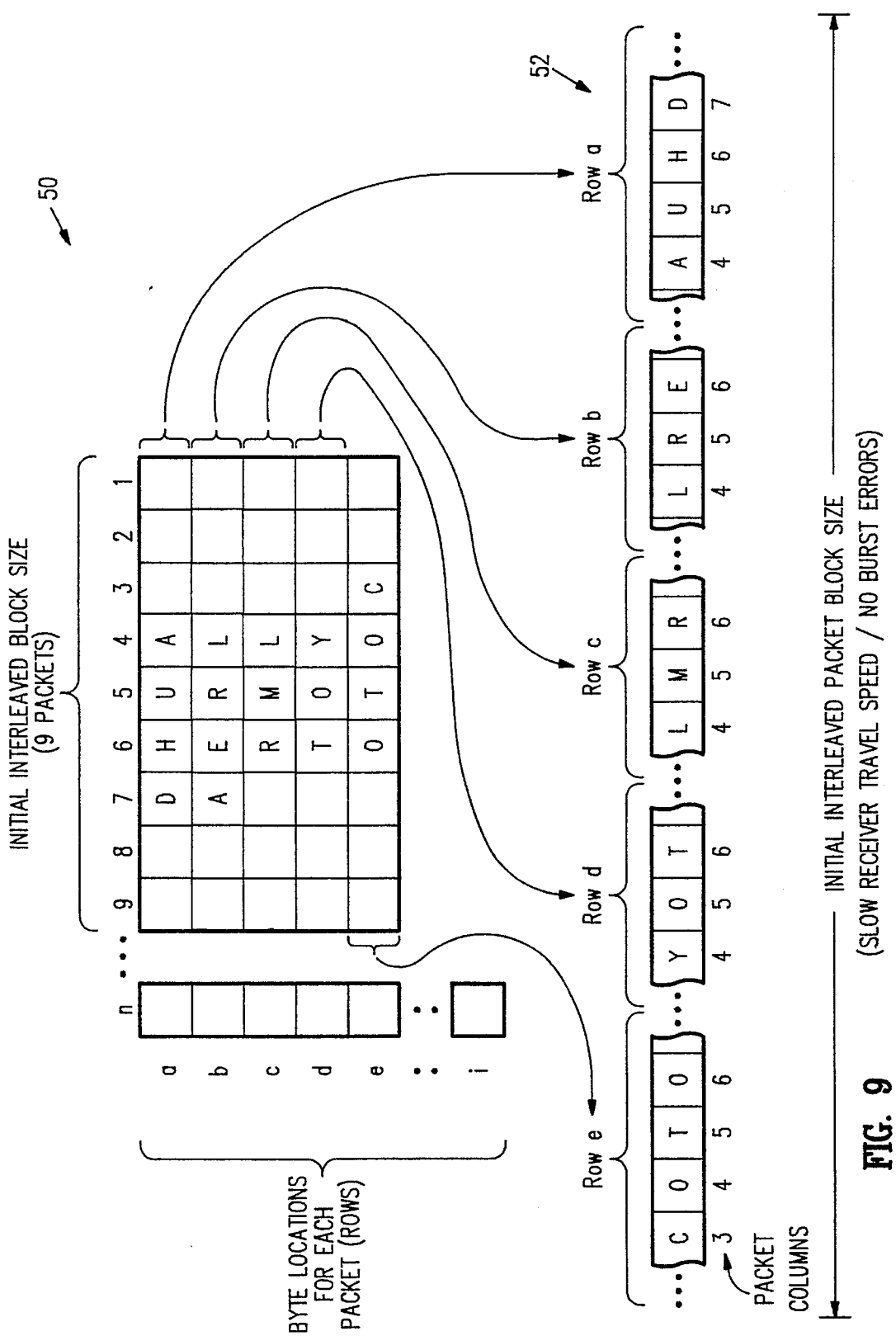
FIG. 9 is a schematic diagram of a transmitter register used for encoding packets into a variable sized packet block according to the invention.

FIG. 9 shows a diagram for a block coding technique (interleaving) according to the invention that increases the probability that each packet can be successfully received. The transmitter determines how many packets should be encoded into each packet block as described above in FIG. 2C.

In the example shown in FIG. 9, the transmitter determines that the receiver travels at a relatively slow travel speed that requires nine packets be interleaved in each transmitted packet block. The data in the first nine packets is then loaded into a register 50. Columns 1-n represent packets and rows a–e represent individual bytes in each packet. For clarity, the contents of packets, other than the message in FIG. 8, are not shown or described. However, it is understood that each byte a–e in each packet 1–9 can contain message data.

The first nine packets are interleaved together so that the byte "e" from packets 1–9 (C,O,T,O) are combined together and then placed in packet block 52. The second byte "d" from packets 1–9 are then combined together and placed in packet block 52. This "interleaving" process is continued until each byte from all nine packets are output in packet block 52. The transmitter then loads the next nine packets of message data into register 50 and performs the same interleaving technique described above.

Figures 10, 11:
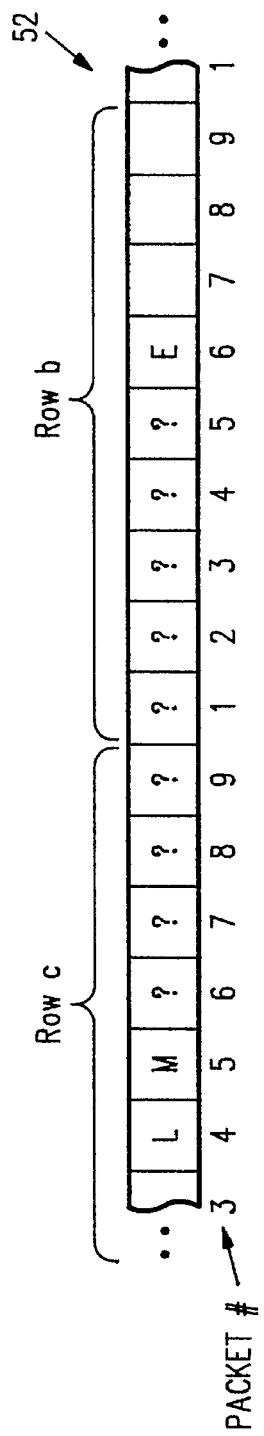
FIG. 10 is a schematic diagram showing a portion of the encoded packet block in FIG. 9 corrupted by the burst error in FIG. 7.
FIG. 11 is a schematic diagram of a receiver register for deinterleaving encoded packet blocks.

FIG. 10 is a portion of the interleaved packet block 52 shown in FIG. 9 including corrupted bytes caused from the burst error 14 (FIG. 7). Burst error 14 corrupts the same number of bytes in packet block 52 that were previously corrupted in the packet sting 16 (FIG. 8). However, the corrupted bytes are now disbursed over more packets. For example, packet 5 now only has one byte corrupted by burst error 14.

Referring to FIG. 11, register 53 is located in the receiver and show the bytes as received from transmitter 20. The receiver de-interleaves the packet block into the 9 original packets initially loaded into transmitter register 50 (FIG. 9). Because no more than one byte is corrupted in any one packet (i.e., 20% corruption per packet), the standard ECC scheme as defined above can be used to correct the corrupted bytes in each packet. Thus, packets 1–9 have each been successfully received and do not need to be retransmitted.

Interleaving packets together is known in the art. However, varying the number of bytes in each packet interleaved together according to receiver speed is novel and provides substantial advantages over existing interleaving techniques.

Explaining further, the interleaving process discussed above increased the number of bytes in each packet successfully received by the receiver. However, if the speed of motion of the receiver changes, the signal drop-out characteristics also change as previously shown in FIGS. 3–5. Thus, the packet block size shown in FIG. 9 (9 packets) may not improve reception reliability at a new receiver travel speed.

Figure 12:
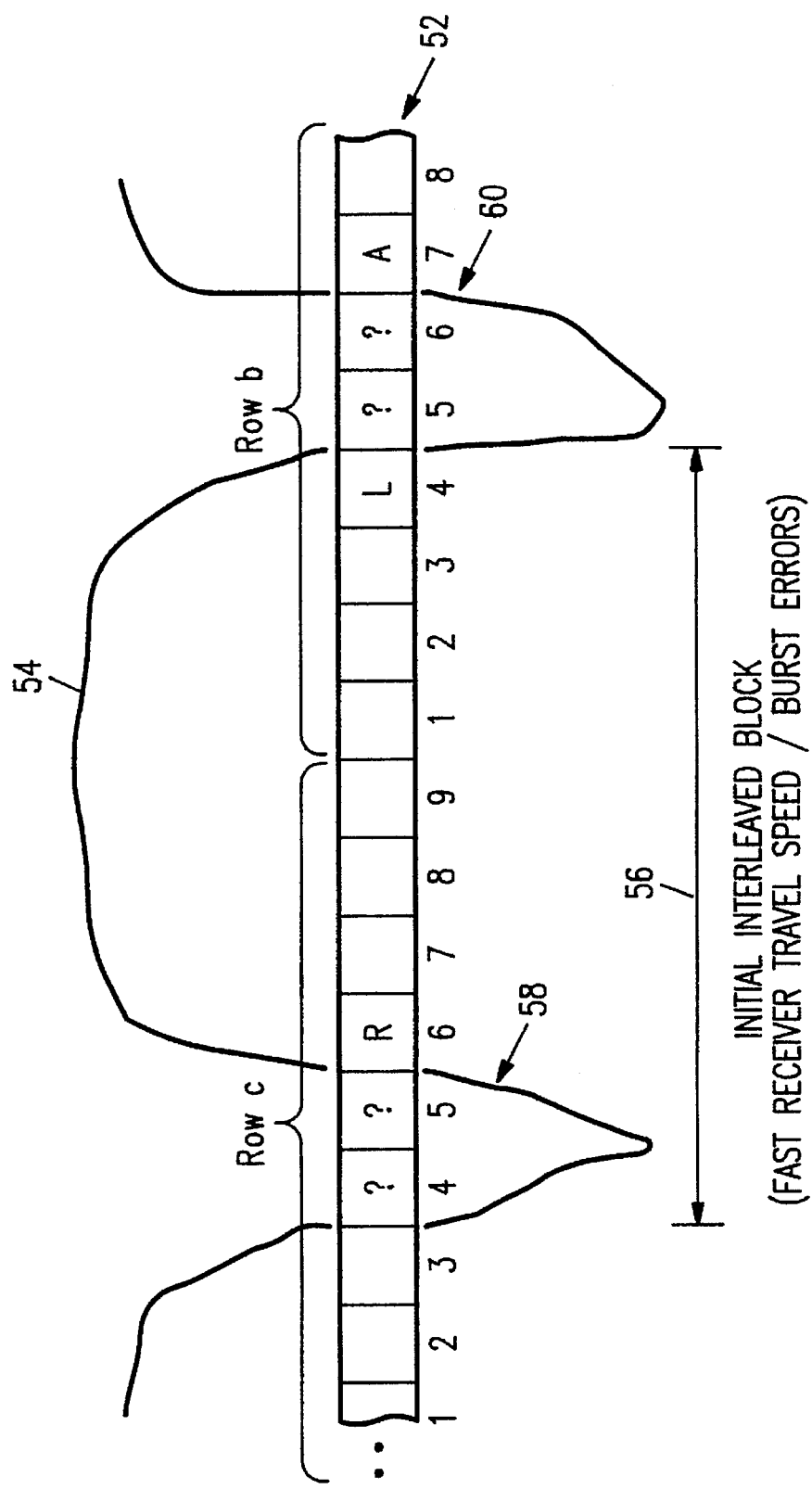
FIG. 12 is a graph showing the drop-out characteristics for a receiver moving at a fast travel speed.

FIG. 12 shows the drop-out characteristic for a receiver moving at a faster speed than the receiver speed associated with the drop-out characteristic shown in FIG. 7. Burst errors 58 and 60 at the new faster travel speed are narrower and have a shorter burst error period 56 than the burst errors 14 and period 30 shown in FIG. 3.

If the transmitter combines nine packets into the packet block as previously shown in 7, the packet block will extend over both burst error 58 and burst error 60. Two burst errors increase the number of corrupted bytes in each packet block, reducing the probability of successfully receiving each packet in the packet block.

To prevent more than one burst error (null) from occurring in any one packet block, the transmitter again adjusts the packet block size according to the new travel speed of the receiver.

Figure 13:
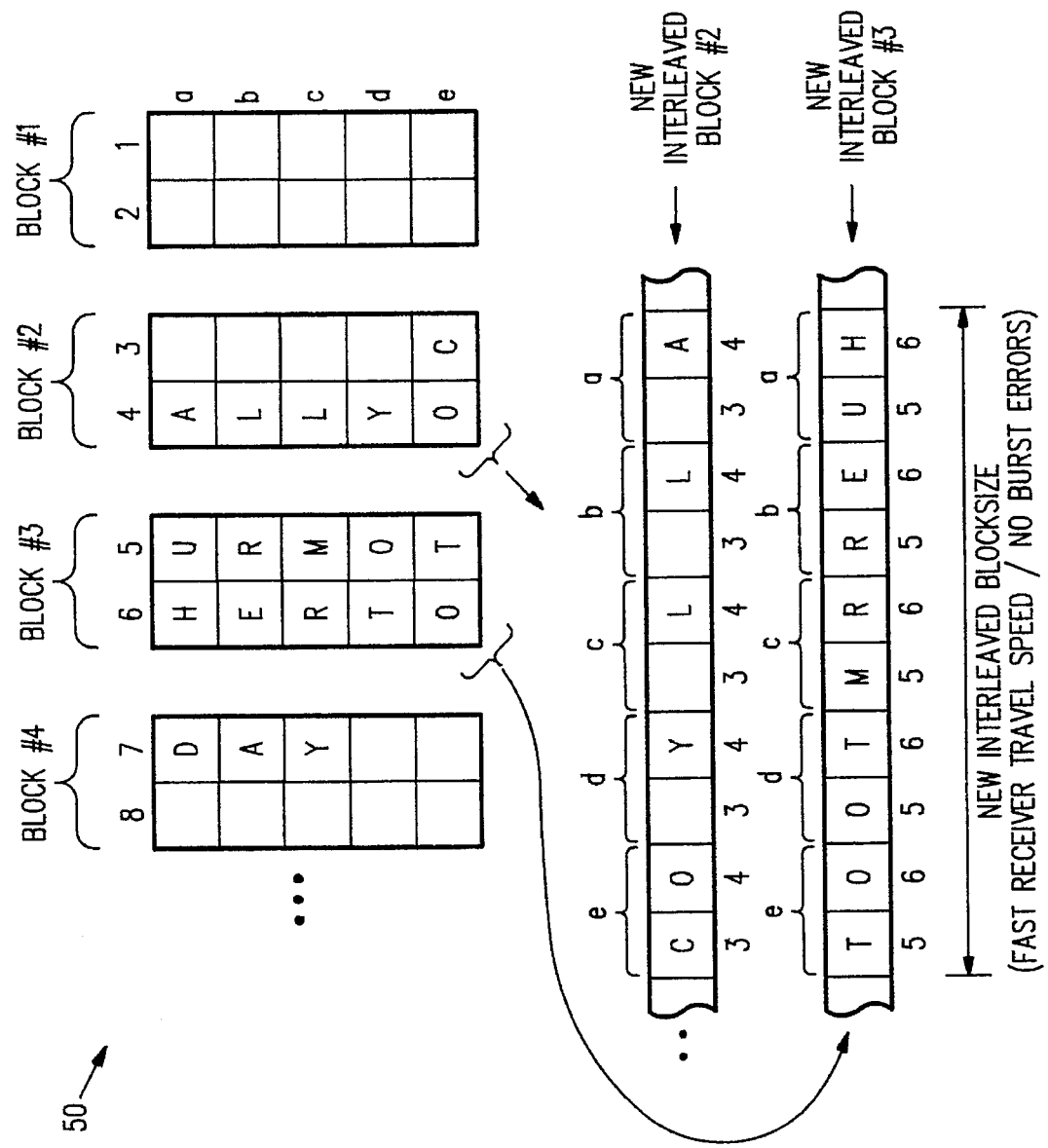
FIG. 13 is a schematic diagram of the transmitter register shown in FIG. 9 encoding a new packet block size according to the drop-out characteristics shown in FIG. 12.

FIG. 13 shows the transmitter register 50 previously shown in FIG. 9. The transmitter 20 changes the interleaved block size from nine packets to a new interleaved block size of two packets. For example, the first portion of the message "CALL YO" is separately interleaved together in packet block #2. The second portion of the message "UR MOTHER TO" is interleaved together in packet block #3. The final portion of the message "DAY" is separately interleaved in packet block #4. The new interleaved block size is smaller so that packet block #5 extends over only one burst error. Thus, there is a higher probability that each packet will be received successfully.

Figure 14:
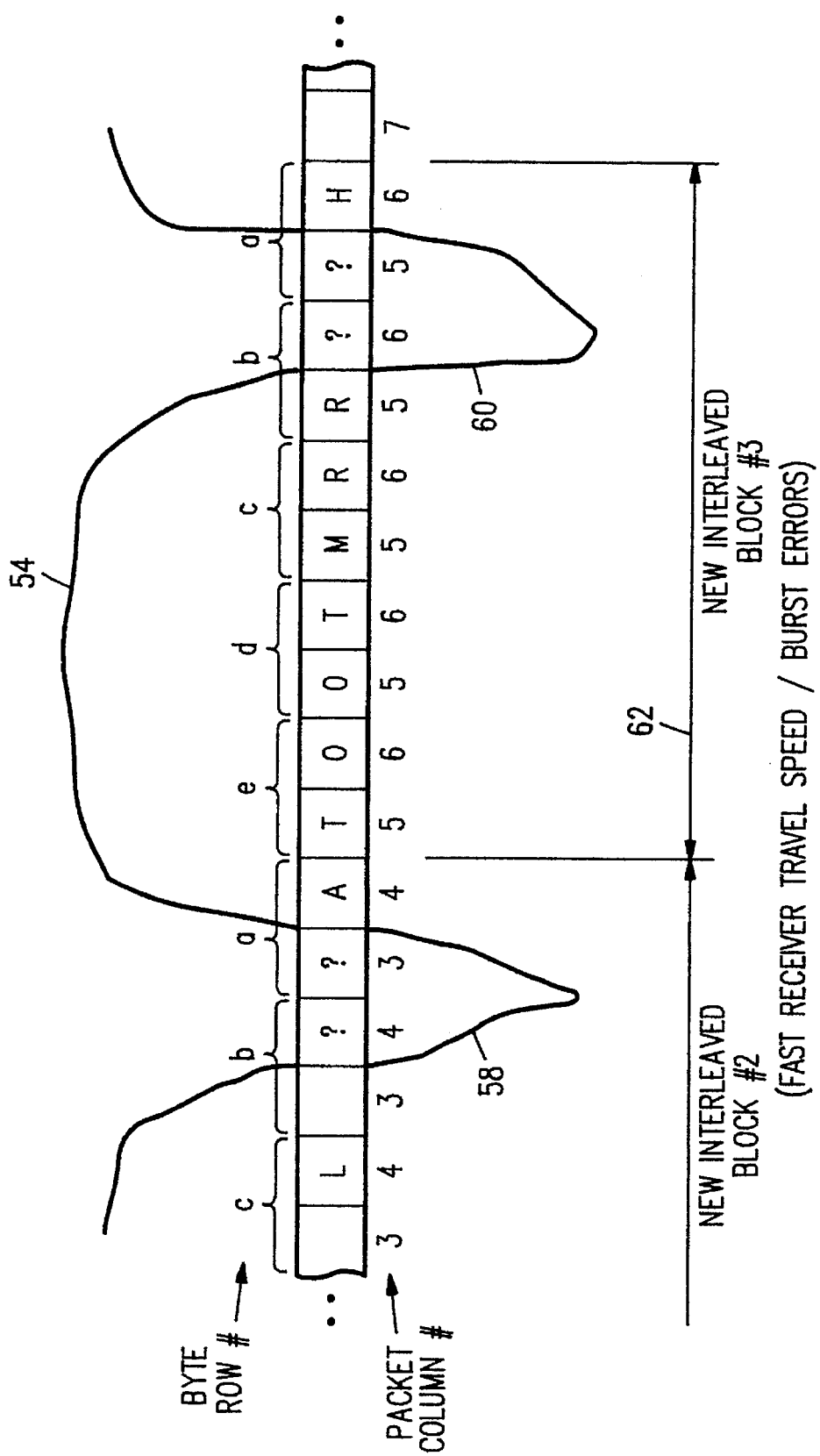
FIG. 14 is a schematic diagram showing burst errors in the small packet block encoded in FIG. 13.

FIG. 14 shows the burst errors 58 and 60 for the new interleaved packet block generated in FIG. 13. Each new interleaved packet block now extends over only one null. For example, packet block #3 extends only across burst error 60 and packet block #2 extends only across burst error 58.

Figures 15, 16:
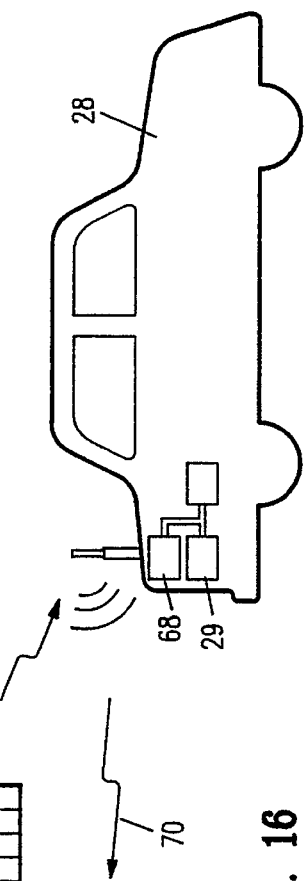
FIG. 15 is a schematic diagram of the receiver register after receiving the packet block in FIG. 14.
FIG. 16 is a schematic diagram of a two-way communication system according to a second embodiment of the invention having a receiver that transmits travel speed of the receiver back to the transmitter.

FIG. 15 is a schematic diagram of the receiver register 52 after receiving the new interleaved packet blocks with the burst errors shown in FIG. 14. Since only one byte in packets 3–6 are corrupted (20%), the standard ECC scheme can be used to correct for burst errors. Thus, the new smaller packet block size increases the probability that each packet will be successfully received by the receiver. A packet block size of two packets is then used for transmitting the 256 time slots of the frame.

If a two way communication link exists between the transmitter and receiver, the receiver can communicate the actual travel speed of the receiver back to the transmitter. FIG. 16 shows the same transmitter 20 and car 28 previously shown in FIG. 2A. However, the receiver 29 further includes a transmitter 68 that sends a signal 70 back to transmitter 20. The receiver transmitter 20 can be coupled directly to the car speedometer so that the signal 70 relays the actual speed of car 28 back to transmitter 20. The transmitter then varies the packet block size according to signal 70.

Figure 17:
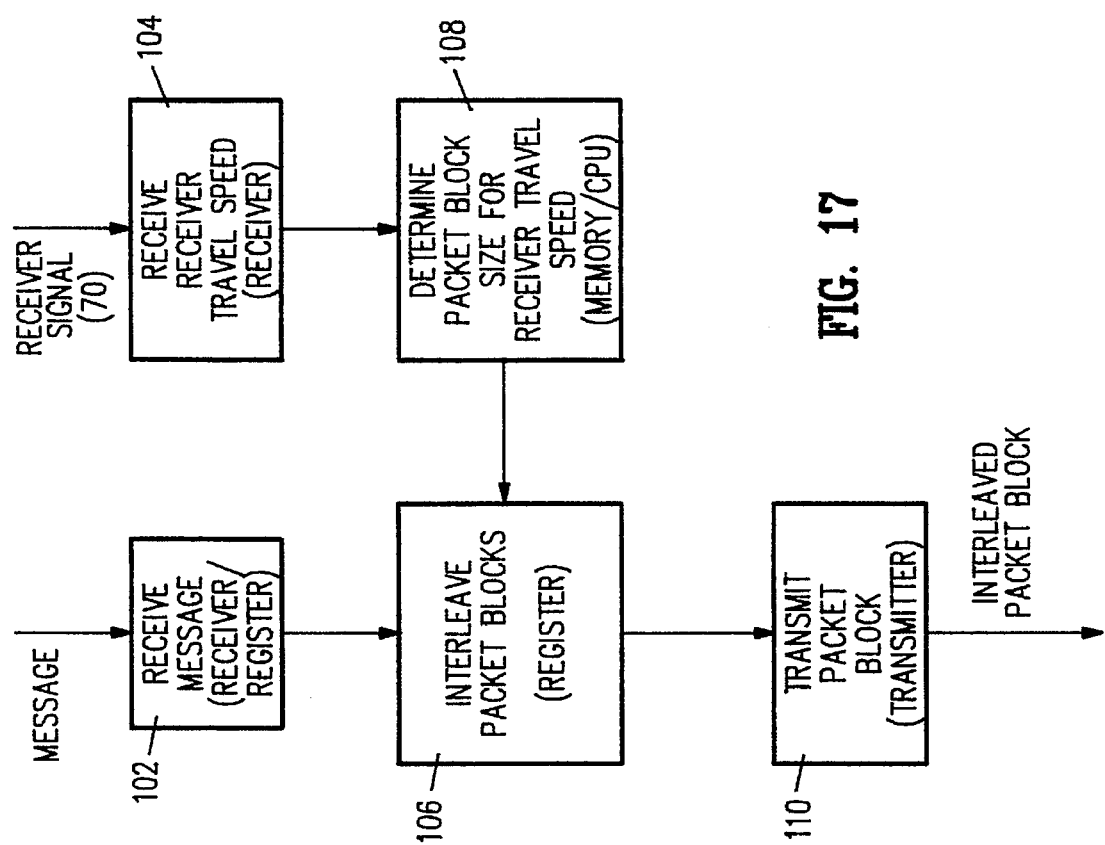
FIG. 17 is a detailed hardware schematic for the system shown in FIG. 16.

FIG. 17 is a detailed diagram of the communication system shown in FIG. 16. A receiver/register 102 receives and temporarily stores a message for transmitting to receiver 29 (FIG. 16). A second receiver 104 receives the receiver signal 70 containing the speed of car 28. A memory and CPU 108 determines the appropriate packet block size for the current car travel speed from signal 70.

The packet block size is determined by reading prestored packet block size values in memory 108. The block size values are stored according to receiver travel speed. Thus, the travel speed received from signal 70 is used as an address to read the memory location containing the appropriate packet block size value. Alternatively, the CPU calculates the packet block size "real time" according to equation 1.

The message from receiver/register 102 and the packet block size value determined in memory/CPU 108 are both input to a register 106 (e.g., register 50 in FIG. 9). The message is then interleaved the packet block size according to the value received from memory/CPU 108. The interleaved packet blocks are then sent to receiver 29 by transmitter 110.

Figure 18:
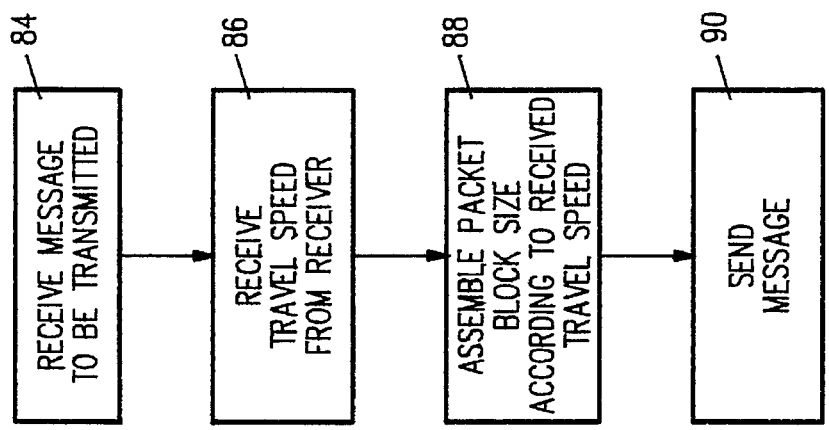
FIG. 18 is a step diagram showing the operations performed by the communication system in FIG. 16.

FIG. 18 is a diagram showing the operations performed by the system in FIG. 17. The transmitter 20 receives a message for transmitting to receiver 29 (FIG. 16) in step 84. The transmitter 20 then reads the transmission signal from receiver 29 indicating how fast car 28 is traveling. Step 88 then calculates the packet block size according to the transmitted car speed from signal 70.

Transmitter 20 either contains a table (not shown) that stores various packet block sizes according to receiver speed or varies the packet block size "real time" according to equation 1. The transmitter downloads the prestored block size number or calculates the block size number associated with the receiver speed and then interleaves the appropriate number of packets into the derived packet block size. The new interleaved packet blocks are then sent to receiver 29 in step 90.

In a two-way communication system the receiver can communicate back to the transmitter when packets are not successfully received. The transmitter can then resend the corrupted packets. The encoding technique described above reduces the number of packets that need to be retransmitted. Therefore, even in two-way communication systems, less transmission bandwidth is used for retransmitting unsuccessfully received messages.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A method for transmitting a message packet to a receiver, comprising:

identifying changes in signal drop-out characteristics each associated with the receiver;

encoding packets into packet blocks;

transmitting each packet block to the receiver; and varying the number of packets encoded in the packet block according to the changes in the signal drop-out characteristics.

2. A method according to claim 1 wherein identifying the signal drop-out characteristics comprise determining a duration and or time period at which burst errors occur in the signal at the receiver.

3. A method according to claim 2 wherein the said signal drop-out characteristics of the receiver is determined by the speed of motion of the receiver and including increasing the number of packets transmitted in each packet block when the speed of motion of the receiver decreases and reducing the number of packets transmitted in each packet block when the speed of motion of the receiver increases.

4. A method according to claim 3 wherein encoding the packets comprise the following steps:
   combining a given number of packets together in a given sequential order each having a given number of data locations;
   combining common data locations in each of the packets together forming data sets, each data set maintaining the same sequential order as the packets; and
   combining the data sets together in a packet block.

5. A method according to claim 4 including varying the given number of packets combined together according to the speed of motion of the receiver.

6. A method according to claim 1 wherein the packet block is sent from a transmitter and including the following steps:
   transmitting a signal from the receiver to the transmitter indicating the speed of motion of the receiver; and
   adjusting the number of packets encoded into the packet block according to the indicated speed of motion.

7. A method according to claim 1 including varying the number of packets encoded in the packet block according to a given object carrying the receiver.

8. A method according to claim 1 including varying the number of packets encoded in each packet block according to the content of the packets.

9. A system for transmitting messages, comprising:
   a receiver having a variable speed of motion, the receiver receiving packet blocks containing the messages;
   a transmitter for transmitting the packet blocks to the receiver; and
   an encoder for combining and varying the number of packets transmitted in each of the packet blocks according to the variable speed of the receiver.

10. A system according to claim 9 wherein the encoder comprises a register for storing packets and interleaving portions of each of the packets together.

11. A system according to claim 10 wherein the receiver includes a register for deinterleaving the packet blocks according to the variable speed of the receiver.

12. A system according to claim 9 wherein the receiver is carried in a car and including means for varying the number of packets combined in the packet blocks according to a given speed of the car.

13. A system according to claim 12 wherein the receiver includes means for transmitting a speed indication signal to the transmitter, the encoder varying the number of packets combined in each of the transmitted packet blocks according to the speed indication signal.

14. A system according to claim 9 including a storage device for storing different packet block sizes each associated with a different speed of the receiver.

15. A method for transmitting multiple message packets to a receiver, comprising:
   identifying a given speed that the receiver is moving;
   determining signal drop-out characteristics according to the given speed of the receiver;
   encoding message packets into packet blocks according to the drop-out characteristics of the signal so that common portions of each message packet are interleaved together in sub-blocks; and
   varying the number of packets encoded in each packet block according to changes in the given receiver speed.

16. A method according to claim 15 wherein the method for encoding packets comprises reducing the number of packets in each packet block when the receiver speed increases and increasing the number of packets in each packet block when the receiver speed decreases.

17. A method according to claim 15 wherein the signal drop-out characteristics comprise multiple burst errors separated by a given period that varies according to the given speed of the receiver and including the step of selecting the number of packets so that each packet block extends over one burst error for any given speed of the receiver.

* * * * *